United States Patent
Rapstine

(10) Patent No.: US 9,155,325 B2
(45) Date of Patent: Oct. 13, 2015

(54) METHOD OF ACCELERATED WATER VAPOR REMOVAL FROM HIGH SUGAR CONCENTRATES

(75) Inventor: Gregory Michael Rapstine, Abilene, TX (US)

(73) Assignee: Coastal Molasses Systems LLC, Rockport, TX (US)

( * ) Notice: Subject to any disclaimer, the term of this patent is extended or adjusted under 35 U.S.C. 154(b) by 634 days.

(21) Appl. No.: 12/928,769

(22) Filed: Dec. 17, 2010

(65) Prior Publication Data

US 2012/0156342 A1 Jun. 21, 2012

(51) Int. Cl.
| | |
|---|---|
| A47J 31/00 | (2006.01) |
| A23L 1/09 | (2006.01) |
| A23N 17/00 | (2006.01) |
| F26B 3/00 | (2006.01) |
| F26B 3/04 | (2006.01) |
| F26B 3/02 | (2006.01) |
| A23K 1/02 | (2006.01) |
| F26B 1/00 | (2006.01) |
| A23K 1/18 | (2006.01) |
| A23G 3/04 | (2006.01) |

(52) U.S. Cl.
CPC ... *A23K 1/02* (2013.01); *A23G 3/04* (2013.01); *A23K 1/1813* (2013.01); *A23L 1/09* (2013.01); *A23N 17/004* (2013.01); *F26B 1/00* (2013.01); *F26B 3/00* (2013.01); *F26B 3/02* (2013.01); *F26B 3/04* (2013.01); *Y10S 366/603* (2013.01)

(58) Field of Classification Search
CPC .................. A23V 2002/00; A23V 2250/5114; A23K 1/1643; A23K 1/186; A23K 1/02; A47J 27/00; A47J 27/002; Y10S 366/603; A23N 17/004; F26B 3/04; F26B 3/02; F26B 3/00; F26B 1/00

USPC ......... 426/471, 392, 635, 523, 658, 390, 422, 426/490, 487; 99/348, 352, 364, 628, 623; 127/34, 42; 159/9.2, 49; 198/625, 676, 198/670
See application file for complete search history.

(56) References Cited

U.S. PATENT DOCUMENTS

| | | | |
|---|---|---|---|
| 3,263,592 A | | 8/1966 | Hickey et al. ............... 99/235 |
| 3,527,642 A | * | 9/1970 | Cochrane et al. ............ 426/635 |

(Continued)

FOREIGN PATENT DOCUMENTS

EP 1 927 291 A1 6/2008 ............... A23K 1/02

OTHER PUBLICATIONS

Falcon Industries, 2010.*

*Primary Examiner* — Rena L Dye
*Assistant Examiner* — Lela S Williams
(74) *Attorney, Agent, or Firm* — M. Susan Spiering; Ferrell's PLLC

(57) ABSTRACT

A process of, and apparatus for, accelerated water vapor removal from molasses is provided. Raw molasses is preheated; continuously agitated while advancing at a flowrate of at least about 1.5 gpm through a cooking apparatus in the presence of a temperature greater than 310° F.; continuously agitated while advancing through a cooling apparatus at a reduced temperature, and while removing separated water vapor water from the cooked molasses to form a cooled molasses having a homogenous temperature profile. The molasses may be admixed with supplements. The product is then packaged. An orificed helical conveyor having a plurality of protrusions from the outer perimeter agitates the cooking molasses. An orificed helical conveyor having gaps in the perimeter of the conveyor alternating with protrusions along the perimeter of the conveyor agitates the cooling molasses.

12 Claims, 3 Drawing Sheets

(56) References Cited

U.S. PATENT DOCUMENTS

| | | | |
|---|---|---|---|
| 3,961,081 A | 6/1976 | McKenzie | 426/658 |
| 4,737,377 A | 4/1988 | Lane et al. | 426/635 |
| 5,482,729 A | 1/1996 | McKenzie et al. | 426/635 |
| 6,976,575 B2 | 12/2005 | Koch et al. | 198/657 |
| 7,028,932 B2 * | 4/2006 | Lucas et al. | 241/101.8 |
| 7,045,165 B2 | 5/2006 | Westberg | 426/635 |
| 7,521,076 B1 | 4/2009 | Wenger et al. | 426/510 |

* cited by examiner

METHOD OF ACCELERATED WATER VAPOR REMOVAL FROM HIGH SUGAR CONCENTRATES

FIELD OF INVENTION

The present invention is broadly concerned with an improved process and apparatus for the removal of water vapor from high sugar concentrates such as molasses, and the crystallization of sugar in the concentrates. More particularly, the invention pertains to the manufacture of animal feed supplements in the form of nutrient tubs, especially molasses tubs. The present invention may also have applicability to confections, pasteurization, and foods such as salsa. In preferred forms, a molasses-based preblend is continuously passed through a direct thermal interchange continuous cooker and a batch-cooking assembly followed by moisture removal and partial cooling; a dry mixture including vitamins and proteinaceous ingredients is then added to the cooked preblend, and the resultant feed supplement is further cooled and packaged.

BACKGROUND OF THE INVENTION

Animal feed supplements, as used herein, are manufactured nutritional products intended to supplement the basic forage, hay, grain or other diet of livestock such as bison, domesticated cattle, sheep, goats, deer, and horses, whether confined or unconfined. Molasses-based feed supplements have long been used to enhance the diets of livestock, particularly cattle. Such supplements are commonly in the form of a solid block and are placed in a stockyard for ad libitum consumption by the animals.

The rate of consumption is affected by factors including ambient temperature, humidity, tub placement location, and amount of sunlight. These factors vary from season to season. Other factors include product hardness, livestock body condition, and livestock production phase. Therefore, typically a harder product is necessary during summer months, whereas a softer product is necessary during the winter.

Crystallization of the sugars and the water content in the final product are important to obtaining the desired effect of nutrient tub consumption in livestock or wildlife. The crystallized sugars serve to encapsulate desired feedstuffs. Products vary in moisture content, for example, from about 2 weight % to about 6 weight %, for added support in consumption requirements based on the animals' daily protein, energy, and mineral deficiencies in normal non-confined or confined placements. Some products require a very low water content to ensure that the animal does not consume too much of the nutrient supplement. This is because the additional amount of nutrients consumed is essentially wasted after the daily nutritional needs are met.

This encapsulation process lengthens the duration of vitamin potency retention. Without encapsulation in a nutrient tub, most vitamins will lose potency due to oxidation when exposed to factors such as sunlight, moisture (e.g., snow) or humidity, wind, and extreme temperature. For example, cut dry roughage (such as hay) typically loses its Vitamin A content in about 6 months. The encapsulation process allows the longevity of feedstuffs to be extended for years due to reduced exposure to environmental factors and a resulting lack of oxidation.

Conventional nutrient tub production facilities are large in size. A tub production facility can take up several thousand square feet. The equipment is permanently fixed to the existing structure for the life of the facility. The conventional equipment used in these facilities offers minimal product flexibility. In addition, the reduction of water content in the final product is limited by the conventional equipment because of efficiency losses. Conventional production facilities experience heat transfer inefficiencies due to the use of a heat transfer medium.

A direct fire heat source has not been used in other nutrient tub production facilities, because of the charring that easily occurs. To minimize charring of the high sugar concentrate, other tub production facilities use an indirect heat source (usually steam), wherein heat is transferred via a jacket. The temperature of the heat source is generally limited to a maximum of about 500° F.

The manufacture of molasses-based animal feed supplements is known. For example, U.S. Pat. No. 3,961,081 to McKenzie, entitled Molasses Feed Block for Animals and Method of Making Same, discusses cooking temperatures and time required for heating molasses. U.S. Pat. No. 4,737,377 to Lane et al., entitled Method for Making a Molasses-Based Animal Feed Mass, describes a process from preheating to cooling, with a two-step cooking process using steam to heat molasses. U.S. Pat. No. 5,482,729 to McKenzie et al., entitled Continuous Process for Manufacturing Animal Feed Blocks, discloses heating, preferably by indirect heat, a blend of molasses and vegetable fat to about 300° F.-400° F. for 5.5-7.1 minutes. U.S. Pat. No. 7,045,165 to Westberg, entitled Process for Manufacturing Animal Feed Supplements, shows a two-step process for cooking a blend of molasses and vegetable fat, wherein the first step operates, preferably by indirect heating, at temperatures of between 240° F.-320° F.

The use of screw conveyors to transport food substances is also known. U.S. Pat. No. 4,181,072 to Hirahara, entitled Continuous Pressure Cooking Apparatus, teaches a screw conveyor cooker for cooking particulate foods in sauce, and that continuous screw conveyor pressure cookers with inlet and outlet valves have been previously used for processing animal feed grains, such as milo. The screw conveyor of Hirahara, having intact flights, induces the flow of food through the cooker. U.S. Pat. No. 6,965,575 to Koch et al., entitled Process and Device for the Continuous Conveyance of Confections, describes helical rotors to convey confectionary material from a cooker to an evaporation space and further to a vacuum space.

Conventional nutrient tub manufacturing facilities have several disadvantages. If a conventional tub production facility utilizes steam as a heat transfer medium, additional burn hazards are present. Steam is a difficult heat transfer medium to contain. Steam piping often leaks at pipe fittings and connections. Conventional tub production facilities generally require boilers and additional insulated piping to carry steam. Insulation must be maintained on steam piping to prevent energy losses. In addition, water tanks and conditioning equipment must be purchased to utilize steam as a heat transfer medium. Costs for boilers and additional equipment can range as high as hundreds of thousands of dollars. These are significant start-up costs. Costs for additional building space as required by conventional tub production facilities can also be significant (potentially hundreds of thousands). Maintenance costs should also be considered. Conventional tub production facilities must maintain steam piping and fittings. Insulation must be kept in good working order to prevent heat losses. Heat losses are costly when fuel costs are considered.

There is a need for a compact nutrient tub production apparatus that would allow for a transportable facility. There is also a need to reduce the production time necessary to manufacture nutrient tubs while maintaining the quality of the product.

SUMMARY OF THE INVENTION

The present invention improves upon the prior art by utilizing innovative compact heat exchangers that allow a nutrient tub producer to have a transportable facility. In addition, the physically shorter production process allows the flexibility of short production time requirements. This gives the unit more flexibility to provide specific customer requirements without the losses otherwise inherent to customization in a large production format. The innovative production process also improves the previous art by removing water vapor from the product with superior efficiency. Operating costs for the inventive apparatus are significantly lower than conventional nutrient tub production units. Start-up and maintenance costs are also significantly reduced. The size of the unit is generally smaller than others known in the industry, requiring less space for production.

To produce a useable high sugar concentrate (HSC) product, it is critical that charring of the high sugar concentrate be prevented or at least minimized. This is achieved by utilizing a design that repeatedly breaks surface tension and uniformly distributes heat throughout the cooking unit.

The present invention enables the manufacture of nutrient tubs with greatly reduced labor costs, energy costs, and a much smaller facility size than a conventional facility. It has been found that productivity has been increased compared to conventional indirectly heated manufacturing systems. This productivity is realized by being able to make more product in the same amount of time and with a smaller facility.

There is thus provided in accordance with the invention a process of accelerated water vapor removal from a high sugar concentrate and an apparatus for carrying out the process. The process comprises a series of steps beginning with preheating a raw high sugar concentrate. The preheated high sugar concentrate is continuously agitated at a suitable pressure while advancing through a cooking apparatus in the presence of an elevated temperature to form a cooked high sugar concentrate. The elevated temperature is sufficient to separate a predetermined portion of water vapor from the high sugar concentrate. The cooked high sugar concentrate is continuously agitated at a suitable pressure while advancing through a cooling apparatus at a reduced temperature to form a cooled high sugar concentrate. Separated water vapor water is concurrently removed from the cooked high sugar concentrate. Supplements may optionally be admixed into the cooled high sugar concentrate to form a supplemented high sugar concentrate. The cooled and optionally supplemented high sugar concentrate is then packaged. Agitation of the high sugar concentrate during both heating and cooling is performed using a plurality of orificed helical conveyors having a plurality of protrusions from the outer perimeter.

Other aspects and advantages of the present invention are described in the detailed description below and in the claims.

BRIEF DESCRIPTION OF THE DRAWINGS

The invention is described in detail below with reference to the appended drawings, wherein like numerals designate similar parts. In the Figures.

DETAILED DESCRIPTION OF THE INVENTION

The invention is described in detail below with reference to several embodiments and numerous examples. Such discussion is for purposes of illustration only. Modifications to particular examples within the spirit and scope of the present invention, set forth in the appended claims, will be readily apparent to one of skill in the art. Terminology used herein is given its ordinary meaning consistent with the exemplary definitions set forth immediately below.

As referred to herein, the term "high sugar concentrate" may refer to monosaccharides such as glucose or fructose, disaccharides such as sucrose (from sources such as beet or cane) or maltose, and oligosaccharides such as raffinose and cyclodextrins (for example, alpha or beta cyclodextrins may be used as encapsulation aids and modifiers), and sugar alcohols, also referred to herein as polyol sugars, such as maltitol, isomalt, mannitol, and sorbitol, as well as liquid and semiliquid materials comprising such saccharides, such as molasses, corn syrup, corn steep, honey, agave nectar, and juices such as apple or pear juice. The process and apparatus of the invention may also suitably be used for other additives, such as carbohydrates including polysaccharides such as maltodextrin (from sources such as rice, potato, or corn), starches, cellulose and cellulosic polymers, and the like, or additives silica (from sources such as quartz), urea, amino acids, acetylated amino acids, ethyl alcohol, proteins such as yeasts, dairy products, soya, legumes, or seed meals, and complex minerals and chelates and the like.

In the context of the present specification, wetting components are those that come in contact with the high sugar concentrate.

The density of the high sugar concentrate may be expressed in Brix or specific gravity. Brix (or ° Bx) is a measure of total dissolved solids and varies based on the extraction method, for example of sucrose from beets, used. One degree Brix corresponds to 1 gram of sucrose in 100 grams of aqueous solution, and thus approximates a percent by weight. Brix values also vary depending upon the source of sugar (for example, beet, cane, or citrus), as the sugar remaining in the molasses after sucrose extraction is dependent upon the source, and this results in higher or lower Brix values. The high sugar concentrate preferably is provided with as high a Brix level as possible. For example, molasses is commercially available with a range of Brix of about 76 to about 86. Very high Brix levels can result in a material that is difficult to handle. As another example, sugar beet molasses is a by-product of the manufacture of sucrose from based and may be at least 79.5° Brix. This corresponds to a specific gravity of 1.41. In the present invention, for example, for a high sugar concentrate material of molasses, the density may increase due to the preheating, cooking and cooling steps from about 78 Brix to about 85 Brix.

Figure 1:
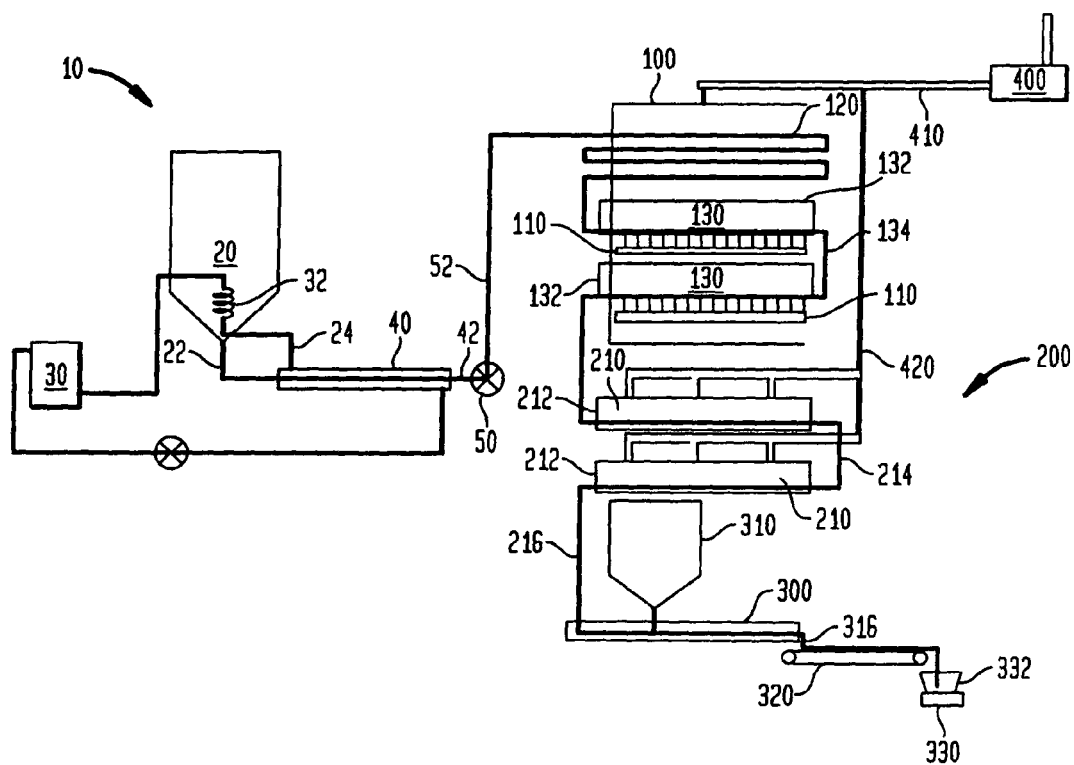
FIG. 1 shows a flow diagram of the water removal process from high sugar concentrates according to the invention.

A system 10 for producing a high sugar concentrate-based animal feed supplement is disclosed in FIG. 1. The system 10 is provided with a heating chamber 100, a cooling region 200, a dry-ingredient mixer 300, and a vacuum pump 400 for removing spent gases from the heating chamber and moisture from the cooling units.

The high sugar concentrate raw material is stored in an optionally-heated tank 20 provided with a heater 30 and tank heating tubes 32 and may be routed through a product conditioner 40 before it is provided to the heating chamber 100. Flowrate through the system 10 is controlled by pump 50.

The heating chamber 100 is provided with a plurality of burners 110, a series of preheat tubes 120 and at least one cooking unit 130. Each cooking unit comprises a heat-exchanger wall 132 and a cooking auger 140, shown in FIG. 2.

The cooling region 200 is provided with at least one cooling unit 210. Each cooling unit 210 is provided with a wall 212 and a cooling auger 220, shown in FIG. 4.

The dry-ingredient mixer 300 is provided with a dry ingredient storage tank 310, a wall and auger (not shown), a metering belt 320 for receiving mixed product, and a scale 330 suitable for supporting product tubs 332.

High sugar concentrate is pumped from tank 20 through product conditioner 40 into preheat tubes 120 which raise the temperature of the high sugar concentrate close to a predetermined cooking temperature. The high sugar concentrate is transferred from preheat tubes 120 into a first cooking unit 130, two of which are shown in FIG. 1. Preheat tubes 120 and cooking units 130 are heated by burners 110. The high sugar concentrate is transferred from the first cooking unit to a second cooking unit 130 via transition 134. In the cooking units 130, the high sugar concentrate is agitated as the temperature increases. Exhaust gases produced in the heating chamber 100 are removed via line 410 by vacuum pump 400. The cooked high sugar concentrate exits the second cooking unit 130 via transition 136 and enters a first cooling unit 210, two of which are shown. High sugar concentrate is moved from the first cooling unit to a second cooling unit 210 via transition 214. As the high sugar concentrate moves through the at least one cooling unit 210, the concentrate is agitated and releases moisture and heat. The moisture is removed from the cooling unit(s) 210 via line 420 by vacuum pump 400. The cooled high sugar concentrate exits the second cooling unit via transition 216 and enters mixer 300, which is typically a ribbon mixer. The mixer 300 agitates the cooled high sugar concentrate and blends in dry ingredients, such as protein, vitamins and minerals, metered from dry ingredient tank 310, resulting in a product wherein the high sugar concentrate serves to suspend the dry ingredients. Blended product, having a consistency similar to taffy or cookie dough, is deposited onto metering belt 320 via transition 316. Metering belt 320 delivers predetermined amounts of blended product into tubs 332 by weight, as monitored using scale 330.

Figure 2:
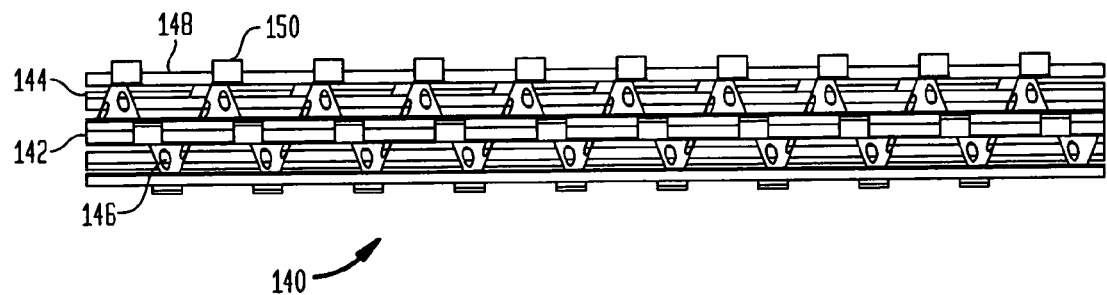
FIG. 2 illustrates a heating auger according to the invention.
Figure 3:
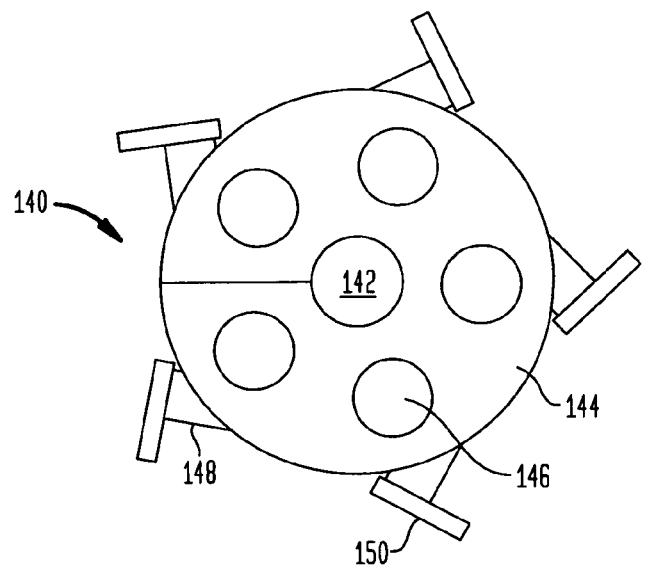
FIG. 3 shows a cross-section of the heating auger of FIG. 2.

FIG. 2 and cross-section FIG. 3 illustrate the features of the inventive cooking auger 140. Auger flights 144 are supported on a central core 142. Orifices 146 are provided at regular intervals along the flights 144, and provide passages through which the high-sugar concentrate passes during the cooking cycle. Non-stick paddles 150 are positioned at regular intervals along the circumference of the flights 144 on angled supports 148. As the auger 140 rotates, the paddles 150 scrape the surface of the wall (not shown in FIG. 2), preventing build-up of highly viscous high sugar concentrate and preventing charring.

Figure 4:
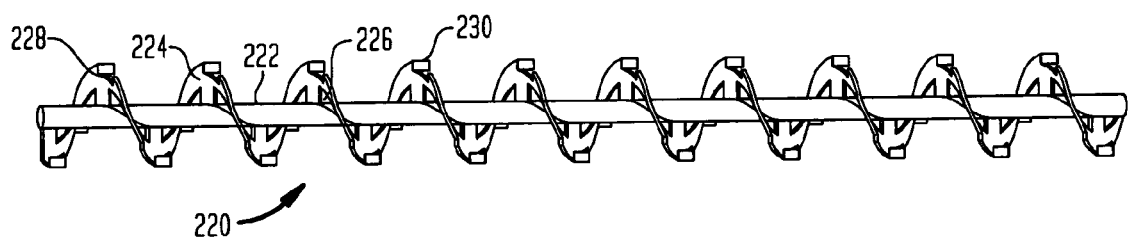
FIG. 4 illustrates a cooling auger according to the invention.
Figure 5:
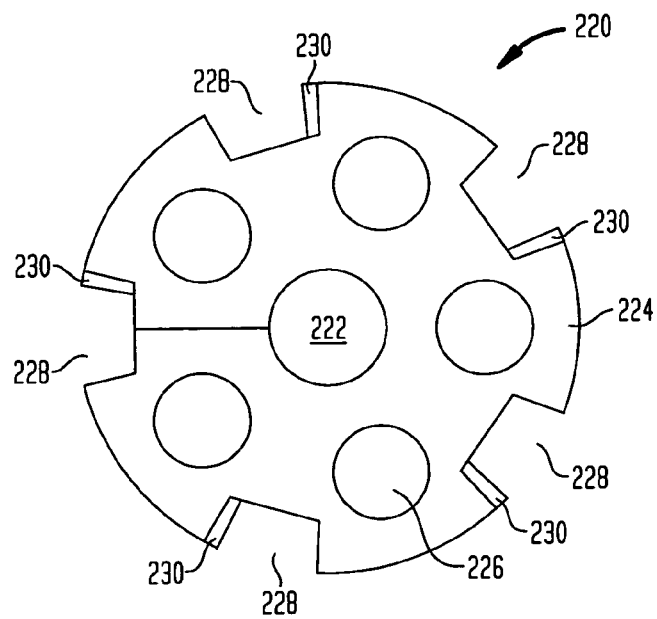
FIG. 5 shows a cross-section of the cooling auger of FIG. 4.

FIG. 4 and cross-section FIG. 5 illustrate the features of the inventive cooling auger 220. Auger flights 224 are supported on a central core 222. Orifices 226 are provided at regular intervals along the flights 224. Gaps 228 are located regularly along the circumference of the flights 224, and alternate with protrusions 230. The protrusions 230 serve to collect viscous high sugar concentrate as it cools and the gaps 228 and orifices 226 allow the passage of the high sugar concentrate, thoroughly agitating and moving the cooling high sugar concentrate progressively forward through the cooling unit.

While not being bound by theory, applicants believe that the agitation provided by the augers by breaking surface tension increases the surface area at which water in the molasses can become water vapor and increases the vapor pressure of water. The amount of water vapor liberated is dependent upon the water content of the molasses. As the cooking process progresses, the water content of the molasses decreases, thus slowing liberation of water vapor. The agitation provided by the inventive apparatus increases the availability of the water remaining in the molasses. As the water content is reduced, caramelization of the sugars occurs wherein sugar molecules bond together, making longer or branched chains of sugar. While not being bound by theory, applicants believe that the present invention exposes molasses to higher temperatures, encouraging an increase in such reaction.

A direct heat source, or direct fire heat source, is used in the present invention, and is controlled by regulating fuel flow. Gas flow may suitably be regulated at a control panel mounted to the apparatus, which may be, for example, an oven. The fuel may suitably be natural gas or propane. The fuel is suitably combusted, for example, in stainless steel burners having a length approximately the same as the cooking units. The direct heat source may reach a temperature of up to about 800° F. This is significantly higher than heat sources used in conventional operations. The higher temperatures achievable by the direct fire heat source allow the elevated cooking temperatures of the high sugar concentrate to be reached more efficiently than conventional systems. Higher temperatures can be used on this unit because of an innovative cooking unit having a novel auger that improves heat distribution. These higher temperatures allow for an improved reduction of water content of the final product. Exhaust may be drawn off using a fan.

Molasses, or another high sugar concentrate, is generally preheated slowly to bring the raw material to a cooking temperature of about 240-310° F. without impairing the raw material, before cooking to remove moisture and crystallize sugars. This also reduces the viscosity of the molasses. Preheating is generally conducted in about 400 to about 500 ft of preheat tubes that run back and forth through the top of a heating chamber. The rate of molasses moved through the preheat tubes is regulated by a pressure valve, and must be maintained at a level that will prevent charring of the molasses. The pressure is generally in the range of around 150 to 200 pounds gauge.

After preheating, the high sugar concentrate is transferred to a cooking unit, in which the temperature of the high sugar concentrate is further increased. The cooking unit comprises a heat exchanger, similar to a conventional scraped-surface heat exchanger, containing a novel heating auger. The heat exchanger is generally cylindrical in shape. The auger, similar to a modified screw conveyor, scrapes the inside of the heat exchanger wall. Paddles, affixed to the flights of the auger, spread molasses over the inside surface of the surrounding cylinder. The auger flights are orificed, having holes spaced regularly across the flights of the auger. The holes decrease surface area to prevent char buildup, as well as provide an alternative route for molasses flow so that the flow is not solely forward through the system. This indirect lateral movement gives the unit more time to break surface tension, in turn giving more time for moisture to be released. Moisture content and crystallization of sugars is generally controlled by temperature and time of operation.

A high sugar concentrate, such as molasses, is moved through the first heating chamber. As the inventive auger rotates, it picks up the molasses and evenly distributes it throughout the inside of the chamber. It also moves the molasses through the system. As the paddles move, the molasses achieves a homogenous temperature by the end of the chamber, and thus a more uniform crystallization of its sugars. The temperature can be regulated from about 200 to about 310° F.

The novel auger distributes heat. The auger may be approximately 12 feet long and approximately 14" in diameter. Commerically-available augers generally provide spacing between flights equal to the diameter of the auger, although different spacing is available. To increase processing speed, the diameter may be increased. The inventive auger may be stainless steel or any other suitable material, particularly tempered metals, such as ferrous metals and alloys including carbon steels and chrome-molybdenum, and non-ferrous metals such as aluminum, copper, and tin, although this list is not intended to be limiting. Molybdenum, cadmium, zinc, tungsten, titanium, nickel, beryllium, carbon, zirconium, magnesium, iron, calcium, aluminum, and copper may be used to harden other metals, such as cobalt-tungsten alloys; any suitable alloys may also be used. The auger may optionally be fluted to allow heat to disperse outward from the core of the auger, thus prolonging the longevity of the equipment. The paddles may be positioned along the circumference of the flights approximately every 72 degrees, providing 5 paddles for a 360 degree revolution. The number of paddles may optionally be increased to 7 paddles per 360 degree revolution, provided that the number of paddles remains odd rather than even to prevent binding or vibration.

A standard auger may suitably be modified consistent with the invention by first attaching angle iron in five places around the circumference. These angle iron pieces traverse the entire length of the auger. The angle iron is then prepared for paddle attachment. The paddles may be attached to the angle iron at each auger flight and angle iron intersection using, for example, stainless steel fasteners. The auger is further modified to reduce the flight surface area by cutting holes through the flights. Reduction of flight surface area helps in uniform heating of the molasses, because rather than allowing for the molasses to collect on the auger, the molasses drips back to the walls of the heat exchanger to continue uniform heating. Three inch diameter holes in the flights are a suitable size. The holes, or perforations, allow backflow as well as advancing cooked material. In contrast, a conventional screw conveyor would advance the high sugar concentrate through the cooking unit too quickly to achieve the benefits of the present invention, whereas a conventional ribbon auger would advance the high sugar concentrate too slowly. The auger rotates at a suitable speed, which may be from about 12 rotations per minute up to about 100 rotations per minute or more.

The paddles may be made of any suitable material, such as TEFLON®, a polytetrafluoroethylene material, or DICRONITE®, a proprietarily modified form of tungsten disulfide. The paddles serve three major functions: (1) the paddles break surface tension of the high sugar concentrate, e.g., molasses, which aids in water vapor removal; (2) the paddles mix the high sugar concentrate to prevent charring by maintaining uniform heat distribution; and (3) the paddles move the high sugar concentrate along the length of the auger axis. There may be about 45 paddles, ensuring that no area on the inner surface of the cooking tube is untouched. Preferably, the paddles overlap. The paddle arrangement allows for the high sugar concentrate to be scraped from the cooking unit wall. In addition, the paddle arrangement moves the high sugar concentrate around the circumference of the cooking unit as well as laterally throughout the length of the cooking unit. The arrangement also allows for high sugar concentrate conveyance to the next unit. Paddle dimensions, configuration and arrangement also affect the product "rate of passage", or the speed with which the high sugar concentrate is moved through the apparatus. A staggered configuration is especially conducive to conveying the high sugar concentrate through the heat exchanger. The paddle size and arrangement have been found to break the surface tension of the high sugar concentrate. Breaks in the surface tension of the high sugar concentrate aid in removal of water vapor. Preferably, the paddles are reversible.

Unlike conventional units that transfer heat indirectly via a heat transfer medium such as steam, the cooking unit of the present invention uses a direct heat source which provides a temperature in excess of 400° F. to the outside wall of the heat exchanger. The modified auger and paddles of the present invention allow such a heat source to be applied without charring the high sugar concentrate. A conventional unit is generally unable to apply direct heat without charring the high sugar concentrate, rendering the product useless.

In a preferred embodiment, two cooking units may be used in series configuration. In this embodiment, high sugar concentrate enters the first heat exchanger one end of the cylinder and exits at the opposite end. Then the high sugar concentrate enters the other cooking unit for additional heating. The present invention provides for significantly shorter heat exchanger length in comparison to a conventional cooking unit.

As the surface of the wall is scraped, denser material is forced to run out the area of the paddle, and less dense material containing a higher concentration of water is allowed to return to the wall surface. Without this circulatory movement, the high sugar concentrate would be charred and rendered unusable. Therefore, this arrangement improves on the previous art by allowing direct fire heating and significantly reducing heat exchanger length. For example, the improved auger configuration may reduce the heat exchanger length by about 66% or more. The innovative design of the heating auger contributes to the compact nature of the heat exchanger. It is believed that this unique design prevents the high sugar concentrate from becoming charred and unusable.

The inventive cooking apparatus comprises compact heat exchangers that allow a nutrient tub producer to have the advantage of a transportable facility. Using the present invention, applicants have surprisingly been able to produce nutrient tubs in a much smaller manufacturing space, allowing smaller, more efficient facilities to be cost-effectively located more closely to the product destination. The cooking apparatus may measure less than 10 feet wide and less than 20 feet in length, and may be anchored to a steel frame that allows the unit to be easily moved. In addition, the physically shorter production process now allows the flexibility of short production time requirements. This gives the unit more flexibility to provide specific customer requirements without the losses in a large production format. The innovative production process also improves the previous art by removing water vapor from the product with superior efficiency. Further, the present invention allows easier control of the density of the final product; i.e., how hard or soft the product is.

After exiting the cooking units, the high sugar concentrate then enters a series of cooling units, for example two units in series. The cooling units utilize a novel cooling auger. The auger combines features of a "cut and fold" auger and a "ribbon" auger or mixer. The combination of these features in the inventive auger allows for high sugar concentrate surface tension to be broken more often than in conventional equipment. In particular, holes are designed in the flights similar to a ribbon auger, and notches are provided at the circumference of the flights similar to a cut and fold auger. The cooling auger may also be manufactured of any suitable material, such as those identified above in relation to the cooking auger. These features provide a bead of molasses around the inner surface of the cooling unit wall and then subsequently scrape the molasses back as the auger rotates. As with the cooking units, the flow in the cooling units is not solely in a forward direction. The cooling units cool the molasses to about 150° to about 175° F. Moisture is drawn off from the cooling units by modest vacuum, for example, using a fan. The use of conventional equipment for the cooling portion of the apparatus would increase the size of the facility significantly. The cooling unit augers may rotate at a speed ranging from about 10 to about 50 rotations per minute (rpm), preferably 20 to 40 rpm, most preferably approximately 25 rpm. The inventive cooling augers improve the ability to regulate and control the temperature of the molasses. This is important for achieving the desired concentration and crystallization of the high sugar concentrate.

A cooling unit auger according to the invention may be attained by starting with a standard auger and removing flight material at various locations. Then, small lengths of angle iron may be welded to the flights at the largest diameter on the auger. Small circumferential lengths of the flight may be removed at each "cut and fold" location.

After cooling and adequate water removal, the high sugar concentrate is conveyed to a suitable mixer, such as a heavy ribbon mixer. Desired dry ingredients, such as protein, vitamins and minerals, are mixed into the partially cooled molasses, over a period ranging from about 1 minute to about 5 minutes, resulting in a product having a consistency similar to cookie dough at a temperature of about 120 to 160° F., preferably about 130 to about 150° F. Once the mixture cools, it hardens much like corn syrup in peanut brittle. Then the high sugar concentrate with the dry ingredients is conveyed to a product container, such as a tub. The product is weighed and moved to a storage facility.

Nutrients added are generally in a form of a premix. The premix can be customized for the needs of the customer and have a variety of nutrients to add to the cooked molasses. Suitable nutrients added to the cooked molasses may include, but are not limited to, microorganisms, such as yeast, enzymes, vitamins, such as A, B, D, and E, minerals, such as zinc, calcium, magnesium, phosphorus, manganese, copper, and protein sources such as grain or feather meal. A more extensive listing of feed ingredients may be found in Chapter 7 of the *Feed Inspector's Manual*, Second Edition, published May 1, 2000 by the Association of American Feed Control Officials Inspection and Sampling Committee.

Tubs may be from about 5 lbs. to about 1250 lbs. Finished, cooled tubs may be relatively hard or relatively soft depending upon the desired properties of the product. The hardness of the product regulates consumption to the rate desired by a customer for a particular application. The hardness is determined by the maximum temperature to which the molasses is cooked; the higher the temperature, the harder the tub. The temperature may be controlled by the rate of flow of the molasses through the cooking units. For example, the flow rate may range from about 1 gallon per minute (gpm) to about 5 gpm.

Table 1, below, provides a general relationship between the ambient temperature at the point of consumption, the rate of molasses required, and the molasses temperature achieved in the heating chamber.

TABLE 1

Operational Parameters as a Function of Ambient Temperature.

| AMBIENT TEMPERATURE, ° F. | MOLASSES RATE, gal/min | MOLASSES TEMPERATURE AT CONTROL VALVE, ° F. |
|---|---|---|
| 30-50 | 2.10-2.4 | 250 |
| 50-65 | 1.95-2.10 | 250-260 |
| 65-85 | 1.8-1.95 | 260-270 |
| 85-100 | 1.65-1.8 | 270-290 |
| 100+ | 1.5-1.65 | 290-300 |

A conventional facility would require three times as much length in the heating chamber, and three times as much length in the cooling chamber. Therefore, an apparatus according to the invention achieves a reduction in length of approximately 66%.

The invention achieves better utilization of energy than conventional facilities.

Conventional cooling units frequently are equipped with a water jacket to aid in heat removal. However, applicants have discovered that a water jacket is inadvisable for cooling because it encourages condensation in the molasses.

Crystallization in molasses is a function of temperature, as is moisture removal.

Wetted components of the inventive apparatus are manufactured of suitable materials, particularly tempered metals, such as stainless steel, other ferrous metals and alloys including carbon steels and chrome-molybdenum, and non-ferrous metals such as aluminum, copper, and tin, although this list is not intended to be limiting. Molybdenum, cadmium, zinc, tungsten, titanium, nickel, beryllium, carbon, zirconium, magnesium, iron, calcium, aluminum, and copper may be used to harden other metals, such as cobalt-tungsten alloys; any suitable alloys may also be used. Stainless steel is a preferred material for corrosion resistance and availability.

EXAMPLE

Molasses is stored in a 9000 gallon tank in ambient conditions. Heat tubes in the tank ensure a viscosity suitable for pumping. The apparatus, comprising pre-heat tubes, cooking chambers, and cooling chambers, is flushed with water for about 1 hour while the burners heat up. The water is drained as molasses flow begins. A very small portion of product, generally less than 1 wt %, is discarded at start up and shut down.

The rate of molasses flow is set to 1.85 gallons/minute to achieve the maximum cooking temperature of 300° F., thus achieving the desired hardness of the finished product. Molasses is brought up to a standardized temperature of 80° F. prior to entering pre-heat tubes. In the pre-heat tubes, the molasses is heated to 280° F. before entering the cooking chambers. The temperature of the heating chamber is constant. The molasses enters a first cooking chamber and proceeds to a second cooking chamber where it is heated to a temperature of 300° F.

As the molasses exits the second cooking chamber, it enters the first of two cooling chambers. The cooking and cooling augers run at constant speeds. An exhaust system draws moisture off the molasses in the cooling chambers in a 5-15% shrink and removes exhaust gases from the heating unit surrounding the cooking chambers.

As the molasses leaves the second cooling chamber, the molasses is mixed in a ribbon mixer with predetermined amounts of dry ingredients consisting of a protein source, vitamins, and minerals, provided in amounts such that the dry ingredients, provided as premix, comprise about 49.2% of the total weight of the product. The speed of the ribbon mixer auger is controlled to achieve desired dry premix ratios. The resulting taffy-like mixture is immediately conveyed into plastic tubs in 200 lb. increments where it cools and hardens for 24 hours. The final product is a 30% protein tub with a guaranteed vitamin-mineral analysis. The speed at which the product is pumped through the unit and the speed at which the units rotate may be adjusted to accommodate another high sugar concentrate. The plant is operated continuously for a maximum of 20 hours per day. At the end of the operation period, the molasses flow is stopped and an aqueous cleaning solution is circulated throughout the apparatus for a period of at least 4 hours.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. An apparatus for accelerated water vapor removal from a liquid or semiliquid material comprising a saccharide, the apparatus comprising:
   (a) a contained heat source;
   (b) preheat tubes positioned above the contained heat source for raising the temperature of the liquid or semiliquid material to a preheat temperature;
   (c) at least one cooking unit, positioned above the contained heat source and connected to the preheat tubes to receive preheated liquid or semiliquid material, comprising a cylindrical wall containing a cooking auger, wherein the cooking auger comprises:
   a central core rotatable about a longitudinal axis thereof;
   an orificed helical conveyor supported on the central core, wherein the orificed helical conveyor includes:
      a plurality of auger flights, and each auger flight includes a plurality of orifices in a spaced-apart relationship with each other for providing a plurality of passages through which the preheated liquid or semi liquid material passes during a cooking cycle, wherein the plurality of orifices facilitates lateral movement of the liquid or semiliquid material along the central core for accelerated breaking of surface tension and water vapor removal therefrom;
      a plurality of angled supports attached to the circumference of the plurality of auger flights, in a spaced-apart relationship with each other; and
      a plurality of protrusions positioned in a spaced apart relationship with each other along the circumference of the plurality of auger flights, wherein a protrusion is attached to an angled support at an intersection of an auger flight and the angled support, wherein each protrusion is nonadherent to the liquid or semiliquid material for scrapping the liquid or semiliquid material from the inner surface of the cylindrical wall on rotation of the central core,
   wherein the cooking auger is effective to prevent charring of the liquid or semiliquid material while the exterior of the outer cylindrical wall is exposed to a temperature maintained above 400° F.;
   (d) at least one cooling unit, connected to the at least one cooking unit to receive cooked liquid or semiliquid material, comprising an outer perimeter wall and a cooling auger, wherein the cooling auger comprises:
   a central core rotatable about a longitudinal axis thereof;
   an orificed helical conveyor supported on the central core, wherein the orificed helical conveyor includes:
      a plurality of auger flights;
      a plurality of orifices provided in a spaced-apart relationship with each other in the plurality of auger flights;
      a plurality of apertures provided in a spaced-apart relationship with each other along a circumference of the plurality of auger flights, wherein an aperture is formed by removing a small circumferential length of corresponding auger flights, and wherein the plurality of orifices and the apertures provide a plurality of passages through which the cooked liquid or semiliquid material passes during a cooling cycle and facilitates lateral movement of the liquid or semiliquid material along the central core for accelerated breaking of surface tension;
      a plurality of angled supports attached to the circumference of the plurality of auger flights, wherein an angled support is attached to an auger flight at a largest diameter of corresponding auger flight; and
      a plurality of protrusions disposed adjacent to the plurality of apertures along the circumference of the plurality of auger flights, wherein a protrusion is attached to an angled support along the circumference for collecting the semi liquid or liquid material as it cools on rotation of the central core and for effectively removing cooked liquid or semiliquid material from the inner surface of the outer perimeter wall;
   and, optionally
   (e) a heavy ribbon mixer effective to mix dry ingredients into cooled cooked liquid or semiliquid material.

2. The apparatus according to claim 1, wherein the apparatus comprises two cooking units in series.

3. The apparatus according to claim 1, wherein the apparatus comprises two cooling units in series.

4. The apparatus according to claim 1, wherein wetted components of the apparatus comprise stainless steel.

5. The apparatus according to claim 1, wherein about 5 to about 7 protrusions are positioned along each 360° revolution of the circumference of the cooking auger.

6. The apparatus according to claim 1, wherein the cooking unit auger spins at a rate of about 12 to about 100 rotations per minute.

7. The apparatus according to claim 1, wherein the cooling auger spins at a rate of about 10 to about 50 rotations per minute.

8. The apparatus according to claim 1, wherein the apparatus is configured to maintain a flowrate of at least about 1.5 gallons per minute through the cooking apparatus.

9. An apparatus for accelerated water vapor removal from a liquid or semiliquid material comprising a saccharide, the apparatus comprising:
   (a) a heat source;
   (b) a preheater for raising the temperature of the liquid of semiliquid material to a preheat temperature;
   (c) at least one cooking unit, positioned above the contained heat source and connected to the preheat tubes to receive preheated liquid or semiliquid material, comprising a cylindrical wall containing a cooking auger, wherein the cooking auger comprises:
   a central core rotatable about a longitudinal axis thereof;
   an orificed helical conveyor supported on the central core, wherein the orificed helical conveyor includes:
      a plurality of auger flights, and each auger flight includes a plurality of orifices in a spaced-apart relationship with each other for providing a plurality of passages through which the preheated liquid or semi liquid material passes during a cooking cycle, wherein the plurality of orifices facilitates lateral movement of the liquid or semiliquid material along the central core for accelerated breaking of surface tension and water vapor removal therefrom;
a plurality of angled supports attached to the circumference of the plurality of auger flights, in a spaced-apart relationship with each other; and
a plurality of protrusions positioned in a spaced apart relationship with each other along the circumference of the plurality of auger flights, wherein a protrusion is attached to an angled support at an intersection of an auger flight and the angled support, wherein each protrusion is nonadherent to the liquid or semiliquid material for scrapping the liquid or semiliquid material from the inner surface of the cylindrical wall on rotation of the central core,
wherein the cooking unit auger is effective to prevent charring of the liquid or semiliquid material while the exterior of the outer cylindrical wall is exposed to a temperature maintained above 400° F.;
(d) at least one cooling unit, configured to receive liquid or semiliquid material from the cooking unit.

10. The apparatus according to claim 9, wherein the liquid or semiliquid material is molasses.

11. An apparatus for accelerated water vapor removal from a liquid or semiliquid material comprising a saccharide, the apparatus comprising:
(a) a heat source;
(b) a preheater for raising the temperature of the liquid of semiliquid material to a preheat temperature;
(c) at least one cooking unit, configured to receive preheated liquid or semiliquid material from the preheater;
(d) at least one cooling unit, connected to the at least one cooking unit to receive cooked liquid or semiliquid material, comprising an outer perimeter wall and a cooling auger, wherein the cooling auger comprises:
a central core rotatable about a longitudinal axis thereof;
an orificed helical conveyor supported on the central core, wherein the orificed helical conveyor includes:
a plurality of auger flights;
a plurality of orifices provided in a spaced-apart relationship with each other in the plurality of auger flights;
a plurality of apertures provided in a spaced-apart relationship with each other along a circumference of the plurality of auger flights, wherein an aperture is formed by removing a small circumferential length of corresponding auger flight, and wherein the plurality of orifices and the apertures provide a plurality of passages through which the cooked liquid or semiliquid material passes during a cooling cycle and facilitates lateral movement of the liquid or semiliquid material along the central core for accelerated breaking of surface tension;
a plurality of angled supports attached to the circumference of the plurality of auger flights, wherein an angled support is attached to an auger flight at a largest diameter of corresponding auger flight; and
a plurality of protrusions disposed adjacent to the plurality of apertures along the circumference of the plurality of auger flights, wherein a protrusion is attached to an angled support along the circumference for collecting the semi liquid or liquid material as it cools on rotation of the central core and for effectively removing cooked liquid or semiliquid material from the inner surface of the outer perimeter wall.

12. An apparatus for accelerated water vapor removal from a liquid or semiliquid material comprising a saccharide, the apparatus comprising:
(a) a contained heat source;
(b) preheat tubes positioned above the contained heat source for raising the temperature of the liquid or semiliquid material to a preheat temperature;
(c) at least one cooking unit, positioned above the contained heat source and connected to the preheat tubes to receive preheated liquid or semiliquid material, comprising a cylindrical wall containing, a cooking auger, wherein the cooking auger comprises:
a central core rotatable about a longitudinal axis thereof at a rate of about 12 to about 100 rotations per minute;
an orificed helical conveyor supported on the central core, wherein the orificed helical conveyor includes:
a plurality of auger flights, and each auger flight includes a plurality of orifices in a spaced-apart relationship with each other for providing a plurality of passages through which the preheated liquid or semi liquid material passes during a cooking cycle, wherein the plurality of orifices decreases the surface area thereof and facilitates uniform heating of the liquid or semiliquid material to prevent charring of the liquid or semiliquid material while the exterior of the outer cylindrical wall is exposed to a temperature maintained above 400° F., and further facilitating lateral movement of the liquid or semiliquid material along the central core for accelerated breaking of surface tension and water vapor removal therefrom, upon rotation of the central core;
a plurality of angled supports attached to the circumference of the plurality of auger flights, in a spaced-apart relationship with each other; and
a plurality of protrusions attached to the plurality of angled supports and extending from an outer perimeter of the orificed helical conveyor, wherein about 5 to about 7 protrusions are positioned along each 360° revolution of the circumference of the cooking auger, and wherein each protrusion is nonadherent to the liquid or semiliquid material for scrapping the liquid or semiliquid material from the inner surface of the cylindrical wall on rotation of the central core;
(d) at least one cooling unit, connected to the at least one cooking unit to receive cooked liquid or semiliquid material, comprising an outer perimeter wall and a cooling auger, wherein the cooling auger comprises:
a central core rotatable about a longitudinal axis thereof at a rate of about 10 to about 50 rotations per minute;
an orificed helical conveyor supported on the central core, wherein the orificed helical conveyor includes:
a plurality of auger flights,
a plurality of orifices in a spaced-apart relationship with each other in the plurality of auger flights,
a plurality of apertures provided in a spaced-apart relationship with each other along a circumference of the plurality of auger flights, wherein an aperture is formed by removing a small circumferential length of corresponding auger flight, and wherein the plurality of orifices and the apertures allow the semiliquid or liquid material to move forward on rotation of the central core;
a plurality of angled supports attached to the circumference of the plurality of auger flights, wherein an angled support is attached to an auger flight at a largest diameter of corresponding auger flight; and a plurality of protrusions disposed adjacent to the plurality of apertures along the circumference of the auger flights, wherein a protrusion is attached to an angled at support along the circumference for collecting the semi liquid or liquid material as it cools on rotation of the central core and for effectively removing cooked liquid or semiliquid material from the inner surface of the outer perimeter wall; and (e) a heavy ribbon mixer effective to mix dry ingredients into cooled cooked liquid or semiliquid material.

* * * * *